United States Patent [19]

Bruce

[11] Patent Number: 4,936,044
[45] Date of Patent: Jun. 26, 1990

[54] LURE STORAGE CONTAINER

[76] Inventor: Samuel E. Bruce, P.O. Box 1165, Crockett, Tex. 75835

[21] Appl. No.: 396,850

[22] Filed: Aug. 21, 1989

[51] Int. Cl.⁵ .............................................. A01K 97/06
[52] U.S. Cl. ..................................................... 43/57.1
[58] Field of Search ..................... 43/54.5, 57.1, 57.2, 43/57.3, 54.1; 206/315.11

[56] References Cited

U.S. PATENT DOCUMENTS

| | | | |
|---|---|---|---|
| 115,175 | 5/1871 | Davis | 43/57.1 |
| 2,711,050 | 6/1955 | McIntyre | 43/57.1 |
| 3,071,885 | 1/1963 | MacKay | 43/57.5 |
| 3,780,468 | 12/1973 | Maffett | 43/54.1 |
| 3,797,161 | 3/1974 | Smallwood | 43/57.5 |
| 3,948,579 | 4/1976 | Schirmer | 43/57.1 |
| 4,245,422 | 1/1981 | Souza | 43/57.5 |
| 4,516,707 | 5/1985 | Crapanzano | 224/202 |
| 4,631,856 | 12/1986 | Born | 43/57.1 |
| 4,770,327 | 9/1988 | Fortson | 224/42.01 |
| 4,829,699 | 5/1989 | Perkins | 43/57.1 |

*Primary Examiner*—M. Jordan
*Attorney, Agent, or Firm*—Harrison & Egbert

[57] ABSTRACT

A container for fishing lures comprising a box, a panel slidably received within the box, and a lure receiving member slidably received by a plurality of horizontal slots on the panel. The box has a front wall, a back wall, and side walls extending between the front wall and the back wall. The box has a first vertical slot extending along one of the side walls. The box also has a second vertical slot extending along another of the side walls. The panel is slidably received by these vertical slots. The panel has a plurality of horizontal slots extending across a surface of the panel. The lure receiving member has a flat surface that has a size suitable for receipt into the horizontal slots of the panel. A circular clip is connected to the flat surface and extends outwardly therefrom for engaging a portion of the lure. The box further comprises a plurality of vertical members in spaced relation attached to the inner surfaces of the side walls of the box. The area between the vertical members defines the vertical slots. Indentations are formed into the top surface of these vertical members so as to receive the bottom edge of the panel.

19 Claims, 2 Drawing Sheets

LURE STORAGE CONTAINER

TECHNICAL FIELD

The present invention relates to lure storage boxes. More particularly, the present invention relates to lure storage boxes having display panels contained therein.

BACKGROUND ART

The storage of fishing lures presents a continuing problem that afflicts many fisherman. There is a wide variety of fishing lures that are utilized by fisherman. The typical fisherman will encounter congealed masses of plastic worms, crusty jars of long-forgotten pork rind, dusty piles of other types of lures, and other assorted debris within the tackle box. The problem of the clean and efficient storage of lures and tackle is a goal that often escapes the fisherman.

The problem of lure storage becomes even more complicated when the fisherman uses a wide variety of crankbaits. Crankbait is plastic molded "fish-like" lures which typically have two sets of treble hooks. Although the hooks are not magnetized, the hooks manage to interconnect and tangle up. It is only rarely that one is able to retrieve a crankbait from the storage compartment without having to perform a complicated procedure to free it from bondage. Every year the fishing industry produces greater varieties of style of crankbait so crankbait accumulation becomes a problem faced by fishermen. In competitive fishing events, it is of prime importance to have a variety of crankbait available for efficient use during the competition.

There are many other problems that face anglers utilizing conventional storage systems. Any moisture that would accumulate in the flat box-like storage trays will cause a problem of rusty hooks. Whenever more than one lure is placed in an individual compartment in a typical storage tray, entanglement becomes a serious problem. Many fisherman utilize plastic worms as bait. When these plastic worms are placed into conventional storage systems, these plastic worms will convey a chemical reaction to the storage box so as to ruin the paint on the crankbaits stored in the storage box. Rubber skirts often fuse to lures when exposed to excessive heat. The frictional movement of the lure within a conventional storage tray will diminish the finish of the lure. Since the finish of the lure is an important factor in attracting fish and catching such fish, it is important to maintain the quality of the finish on the lure, especially for crankbaits. In conventional storage systems, one must search through several boxes, unfold a complicated array of drawers, and carry out excessive manipulation in order to choose the proper lure. If the storage box is turned over or picked up without properly securing the lid of the storage box, the lures will become scattered and disorganized. It is often time consuming to orderly organize the lures. In horizontal drawer systems of storage, it is very inconvenient for the competitive fisherman to stoop over and access the storage box. Furthermore, as the inventory of lures grows, it becomes expensive to purchase additional storage boxes. In brief summary, the conventional storage systems that are available on the market do a poor job of tracking and preserving these lures.

In order to have an effective assortment of crankbait, the crankbait fisherman should be prepared to maintain a supply of approximately seventy-two crankbaits. In competitive fishing, it is very important that the bass fisherman have a systematic selection of crankbaits capable of covering the various depths of which bass might hold: shallow, medium, and deep. Within these particular categories, the fisherman should have wide-wobbling plugs and narrow-wobbling lures and vibrating, lipless crankbaits. Each lure style should be represented in four basic color patterns: shad, chartreuse, gold and crawfish. In addition, the competitive fisherman should pack two of each kind of crankbait just in case a particularly productive crankbait is lost.

Although there are a wide variety of tackle boxes presently available, none of these tackle boxes present a vertical storage system for crankbaits. None of these systems effectively organizes the crankbait in accordance with type, style, and depth. Most of these existing tackle boxes present horizontal storage systems, drawer storage, or unfolding slide styles of storage. As stated previously, none of these particular styles of tackle boxes are effective mechanisms for the use of crankbait.

It is an object of the present invention to provide a lure storage container that allows crankbait to be vertically displayed.

It is another object of the present invention to provide a lure storage container that effectively organizes the crankbait.

It is still another object of the present invention to provide a lure storage container that maintains the finish on the stored lures.

It is still another object of the present invention to provide a lure storage container that is particularly adapted to the storage of crankbait.

It is still another object of the present invention to prevent hook entanglement of the lures within the container.

These and other objects and advantages of the present invention will become apparent from a reading of the attached specification and appended claims.

SUMMARY OF THE INVENTION

The present invention is a container for fishing lures comprising a box, a panel slidably received within the box, and a lure receiving member that is slidably received by a horizontal slot or tracks on the panel. The box has a front wall, a back wall, and side walls extending between the front and the back walls. The box has a first vertical slot extending along one of the side walls. The box also has a second vertical slot extending along the other of the side walls in a position corresponding with and aligned with the first vertical slot. The panel has a plurality of horizontal slots extending along the surface of the panel. The panel is specifically received by the first and second vertical slots. The lure receiving member is a member that is slidably received by the horizontal slots. The lure receiving member detachably receives a portion of a fishing lure.

The box has a plurality of vertical members that are affixed to the inner surface of the side walls. These vertical members define the first vertical slot and the second vertical slot for receiving the panel. These vertical members have a height less than the height of the box. Each of these vertical members has an indentation formed in the top surface of the vertical member. These indentations are aligned so as to receive the bottom of the panel. Specifically, these indentations have an aligned angled surface.

The panel is a flat member having a front side and a back side. This panel has a thickness less than the width of the vertical slots. The plurality of horizontal slots are made up by formed bars that are affixed to the front and the back side of the panel. These bars are formed so as to define a slide area extending through the bar. The panel has an abrasion-resistant material, such as cork, adhesively fastened to the panel between these horizontal slots.

The lure receiving member comprises a flat surface having a size suitable for receipt into the horizontal slot of the panel. The flat surface is slidable within this horizontal slot. A circular receiving member is connected to and extends outwardly from this flat surface beyond the horizontal slot. This circular receiving member engages a portion of the lure. The circular receiving member is a clip that has an open position and a closed position. The open position receives the shank of a treble hook of a lure. The closed position is suitable for locking the lure in position relative to the panel.

The box has a top surface that is hingedly connected to the back wall of the box so as to cover the lures. The box includes a plurality of the vertical slots for receiving a plurality of the panels. The panels are maintained in spaced parallel relationship to each other within the box.

DETAILED DESCRIPTION OF THE INVENTION

Figure 1:
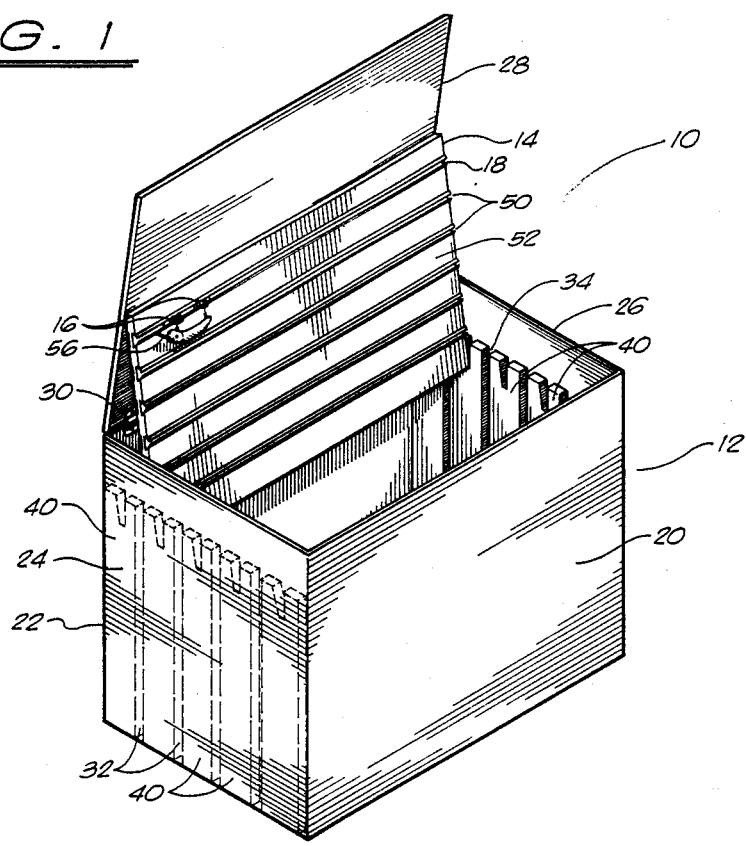
FIG. 1 is a view, in perspective, of the fishing lure container in accordance with the preferred embodiment of the present invention.

Referring to FIG. 1, there is shown at 10, the lure storage container in accordance with the preferred embodiment of the present invention. Lure storage container 10 comprises a box 12, a panel 14 and a lure receiving member 16. The panel 14 is slidably received within box 12. The lure receiving member 16 is slidably received by one of a plurality of horizontal slots 18 positioned on panel 14.

The box 12 has a front wall 20, a back wall 22, and side walls 24 and 26. The side walls 24 and 26 extend between the front wall and the back wall. Box 12 also includes a top 28 that is connected by hinges 30 to the back wall 22. Top 28 serves as a closure for the lure storage container of the present invention.

In FIG. 1, it can be seen that box 12 includes a first vertical slot 32 that extends along side wall 24. A second vertical slot 34 extends along side wall 26. Slots 32 and 34 are located in a position corresponding to each other and are aligned with each other so as to slidably receive panel 14. Ideally, box 12 includes a plurality of vertical slots extending along side walls 24 and 26.

Figure 4:
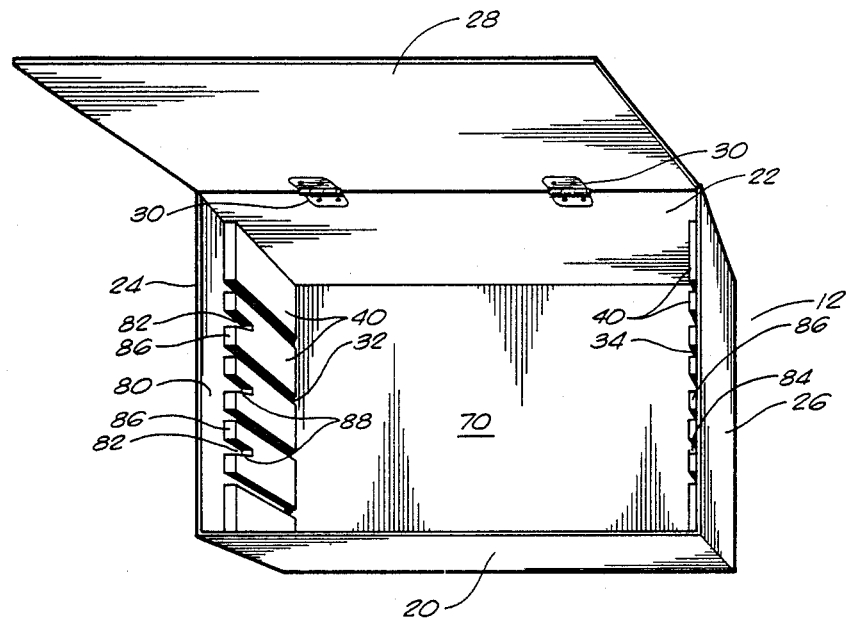
FIG. 4 is a perspective view showing the interior configuration of the box of the fishing lure container of the present invention.

Box 12 also has a plurality of vertical members 40 that are affixed to the inner surfaces of side walls 24 and 26. These vertical members 40 are arranged so as to define the first vertical slot 32 and the second vertical slot 34. As shown in FIG. 1, these vertical members 30 have a height equal to the height of box 12. However, and preferably, as represented in FIG. 4, these vertical members 40 will have a height less than the height of the box 12. Also, as will be shown in conjunction with FIG. 4, each of these vertical members 40 includes an indentation for the receipt of the bottom edge of panel 14.

In FIG. 1, panel 14 is slidably received by the first vertical slot 32 and the second vertical slot 34 of box 12. Panel 18 has a plurality of horizontal slots 50 that extend across the front surface 52 of panel 14. Panel 14 is a generally flat member having a front and back side. This panel has a thickness less than the width of the first and second vertical slots. As such, panel 14 is freely slidable upwardly and downwardly within first vertical slot 32 and second vertical slot 34.

The lure receiving member 16 is slidably received by one of the plurality of horizontal slots 50 on panel 14. This lure receiving member is for detachably receiving a fishing lure 56. As can be seen in FIG. 1, the panel 14 is positioned outwardly from the interior of box 12 so as to be on ready display for the user of the container 10. The lure 56 is slidably received within the horizontal slot 18 so as to display the lure, in a full-bodied fashion, to the observer of the container 10. Although FIG. 1 shows a single lure as positioned on panel 14, it is preferable that a large number of different styles and types of lures be positioned on the forward face 52 of panel 14 so that the fisherman can have an easy visual selection of the proper lure. It can be seen in FIG. 1 that the lure 56 is attached to the lure receiving member 16. Specifically, the lure 56 is attached to the lure receiving member 16 by the shank of the treble hooks of the lure, to be described hereinafter.

Figure 2:
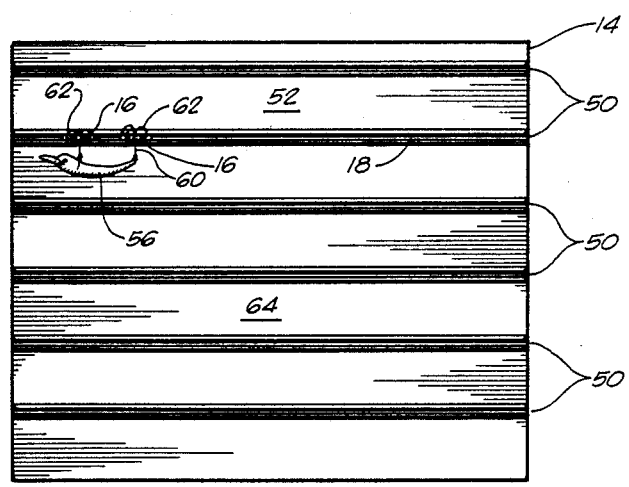
FIG. 2 is a frontal view showing the panel of the fishing lure container of the present invention.

Referring to FIG. 2, there is shown the panel 14 for the receipt of crankbait 56. Specifically, in FIG. 2, it can be seen that panel 14 includes first horizontal slots 50 extending across the front face 52 of panel 14. It can be seen that the slots 50 are positioned in parallel relation to each other. The crankbait receiving member 16 is slidably engaged by the slot 18 of panel 14. As can be seen in FIG. 2, the crankbait receiving member 16 engages the shank portion 60 of treble hooks 62. In this fashion, the treble hooks 62 will never become tangled with an adjacent treble hook. The crankbait 56 hangs downwardly from horizontal slot 18 adjacent to the surface 52 of panel 14. In the preferred embodiment of the present invention, an abrasion-resistant material 64 is adhesively fastened to the surface 52 of panel 14 in the areas between adjacent pairs of horizontal slots. Ideally, this abrasion-resistant material is a sheet of cork. By placing an abrasion-resistant material onto the face 52 of panel 14, the finish on crankbait 56 will survive repeated use of the container 10. Although the crankbait 56 will occasionally encounter and abut the surface of the abrasion-resistant material 64, this style of material will effectively prevent abrasions to the crankbait, and, thusly, preserve the finish of the crankbait.

Figure 3:
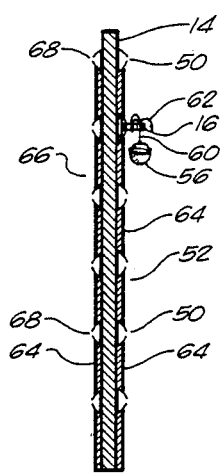
FIG. 3 is a side view of the panel of FIG. 2.

FIG. 3 is a side view of panel 14. Specifically, in FIG. 3, it can be seen that panel 14 includes a front side 52 and a back side 66. The front side includes a plurality of first horizontal slots 50. The back side 66 includes a plurality of horizontal slots 68. As can be seen, on both the front side 52 and the back side 66 of panel 14, the horizontal slots 50 and 68 are positioned in parallel relation to each other. All of these slots are available for the receipt of crankbait 56.

Each of the first horizontal slots 50 and the second horizontal slots 68 are made of a formed bar. Preferably, these formed bars are made of a plastic material that may be affixed to the appropriate surfaces and in the appropriate locations of panel 14. However, this is not to be construed as a limitation on the present invention. These formed bars may also be made of a metal or may be integrally formed within the panel itself. As can be seen, these slots 50 and 68 include a pathway that extends through the center of such bars. This pathway is proper for receiving the crankbait receiving member 16. The abrasion-resistant material 64 extends between adjacent pairs of slots 50 and 68. As can be seen in FIG. 3, the crankbait 56 will reside in close proximity to the surface of the abrasion-resistant material 64. It can be further seen in FIG. 3 that the crankbait 56 is suspended from crankbait receiving member 16 by the treble hooks 62 of the crankbait.

Referring to FIG. 4, there is shown an internal view of box 12, in perspective. Initially, it can be seen that box 12 includes front face 20, back face 22, and side walls 24 and 26. The floor 70 of box 12 is a generally flat surface. Preferably, floor 70 engages the walls 20, 22, 24 and 26 in a watertight fashion. Hinges 30 are positioned at the top of the back wall 22 for the receipt of the top 28. FIG. 4, in particular, shows the arrangement of the vertical members 40 within box 12. It can be seen that the vertical members 40 are affixed to the inner surface of side walls 24 and 26. These vertical members 40 are aligned with each other and correspond with each other on the walls 24 and 26. Specifically, these vertical members 40 define the vertical slots 32 and 34 for the receipt of panel 14. FIG. 4 also shows the preferred embodiment in which the vertical members 40 have a height less than that of the height of box 12. In the area 80, as located between the top of the vertical members 40 and the top of box 12, a storage tray can be positioned. Such a storage tray can be compartmentalized and can be slidably received into this area. This storage tray can be of a standard type having a size for properly fitting within the box 12.

In FIG. 4, the vertical members 40 also include first and second indentations 82 and 84. These indentations 82 and 84 are formed into the top surface 86 of vertical members 40. First indentation 82 is aligned with second indentation 84. The indentations 82 and 84 include an angled surface 88. Indentations 82 and 84 receive the bottom edge of panel 14 so as to allow such panel 14 to be on available display for the fisherman. The angle 88 is arranged so that the panel 14 can be angled for easy view as required. When the panel 14 is removed from slots 32 and 34, the panel 14 can be aligned, lowered, and easily placed into indentations 82.

Figure 5:
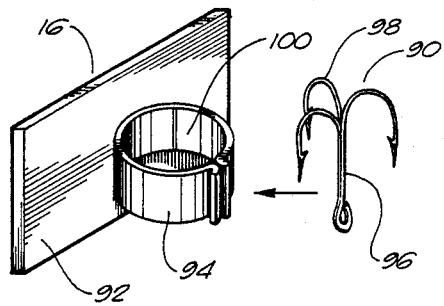
FIG. 5 is an exploded view showing the relationship of treble hook to lure receiving member.

FIG. 5 illustrates the technique by which the lure receiving member 16 receives the lure portion 90. The lure receiving member 16 includes a flat surface 92 that has a size suitable for receipt into the horizontal slots 50 of the panel 14. The flat surface 92 is slidable within these horizontal slots as desired by the user. A circular receiving member 94 is connected to flat surface 92 and extends outwardly therefrom. The circular receiving member 94 is suitable for engaging a shank portion 96 of treble hook 98 of lure 90. The circular receiving member 94 is, ideally, a clip having an open position and a closed position. The open position serves to allow the shank 96 of treble hook 98 to enter into the interior area 100 of circular receiving member 94. The closed position is suitable for locking the lure portion 94 in position within circular area 100. The lure receiving member 16 may be a product identified as a "SUPER KLIP". This is a product manufactured by Super Glue Corporation of Hollis, N.Y. This product is the subject of U.S. Pat. Nos. 4,240,604 and 4,531,636. This circular receiving member of the "SUPER KLIP" product is movable between a first open position and a second closed position. As such, such a product is ideal for receiving the shank portion 96 of treble hook 98. A modification is made to the "SUPER KLIP" product by removing the adhesive material from the back surface of flat surface 92. As such, the lure receiving member 16 is suitable for sliding within the horizontal slots.

Figure 6:
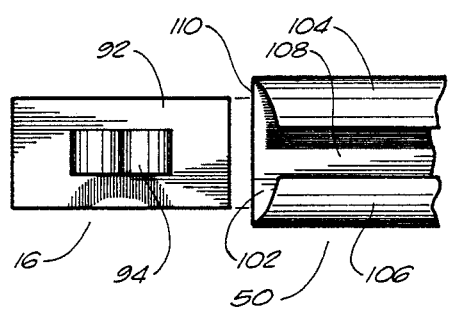
FIG. 6 is an exploded view showing the relationship between the lure receiving member and the horizontal slot.

FIG. 6 shows how the lure receiving member 16 is received by the horizontal slot 50. As shown in FIG. 6, the circular receiving area 94 is extending outwardly from the flat surface 92 of the lure receiving member 16. The horizontal slot 50 has a flat back surface 102 which is in surface-to-surface contact with the back surface of flat surface 92 of lure receiving member 16. The walls 104 and 106 of horizontal slot 50 will contain flat surface 92 therewithin while allowing the outwardly extending circular receiving member 94 to extend outwardly through opening 108. In this manner, the lure receiving member 16 is retained within slot 50. The lure receiving member 16 is only removable from slot 50 by sliding the member 16 outwardly from end 110.

Since crankbait typically has two treble hooks, it is preferable that two of the lure receiving members 16 be placed into horizontal slot 50 at the appropriate spaced locations (illustrated in FIG. 2). In this manner, the crankbait is maintained in proper position for proper viewing and will avoid any contact with any adjacent crankbait on panel 14.

The present invention achieves a number of advantages not found in existing lure storage systems. Most importantly, the present invention allows for the storage of crankbait in an efficient manner. The fisherman will be easily able to pull the panels from the box so as to observe the assortment of crankbait mounted thereon. The proper positioning of the panel within the indentations of the vertical members positioned on the box will allow the fisherman easy access to crankbait as needed during fishing tournaments. The usage of four panels with front side and back side slots allows the competitive fisherman the full assortment of 72 crankbaits. The manner of clipping the crankbait within the horizontal slots is an easy exercise for the fisherman. By the use of the present invention, the fisherman is no longer required to solve the complex procedure of freeing the crankbait from bondage with adjacent stored crankbait or lures.

Since the present invention is a vertical system, there is no concern for the accumulation of moisture in the storage trays. Since the moisture will not accumulate in the storage trays, there is no problem with rusty hooks or destruction of lures by water.

The present invention allows the storage of plastic worms in their original bag. For example, the plastic bag may be connected around the lure receiving member so as to suspend these plastic worms in their original bag. As such, the problem of "worm melting" should not occur and, if it should occur, will not damage adjacent lures.

The present invention utilizes an abrasion-resistant material between the adjacent horizontal slots. As such, the present invention enhances the preservation of the finish on the crankbait. The present invention, thusly, will extend the life of crankbait for a long period of time.

The present invention is particularly appealing where accidents are likely to occur. Typical storage boxes will turn over and scatter lures and crankbait everywhere. If the present invention is turned over, the crankbaits will remain secured in their proper position on the panels. The present invention maintains organization even during jostling and spilling.

The present invention is particularly useful for the competitive fisherman. In competitive fishing, time is an extremely important factor. If the competitive fisherman is required to dig and sort through various lures in order to find the proper one, then the competitive fisherman will lose time and possibly lose prize money. On the other hand, the present invention keeps the lures in proper organization for competitive fishing activity. In order to free the crankbait from the face of the panel, a simple task of unclipping the crankbait receiving member is required. There is never the need to untangle the lures when they are properly secured within the present invention.

The standard lure storage system which utilizes horizontal drawers or unfolding drawers has a relatively low profile. In order to sort and examine the lures, the user of standard storage systems must stoop over in order to access such storage systems. The present invention, on the other hand, presents a higher profile to the user and thus easier access to the lures within the system.

Additionally, the present invention is suitable for receiving a large number of crankbaits. In traditional methods, as the inventory of lures grows, the fisherman must buy additional storage boxes. The capacity of the present invention, and its efficiency of storage, allows the receipt of many more lures than conventional systems.

The foregoing disclosure and description of the invention is illustrative and explanatory thereof, and various changes in the details of the illustrated apparatus may be made within the scope of the appended claims without departing from the true spirit of the invention. The present invention should only be limited by the following claims and their legal equivalents.

I claim:

1. A container for fishing lures comprising:
a box having a front wall, a back wall, and side walls extending between said front wall and said back wall, said box having a first vertical slot extending along one of said side walls, said box having a second vertical slot extending along the other of said side walls in a position corresponding to said first vertical slot;
a panel slidably received by said first and said second vertical slots of said box, said panel having a plurality of horizontal slots extending across a surface of said panel; and
a lure receiving means slidably received by one of said plurality of horizontal slots, said plurality of horizontal slots comprising formed bars affixed to said front side and said back side of said panel, said formed bars being formed so as to define a slide area extending through said bars said lure receiving means for detachably receiving a fishing lure.

2. The container of claim 1, said box having a plurality of vertical members affixed to the inner surface of said side walls, said vertical members defining said first vertical slot and said second vertical slot.

3. The container of claim 2, said vertical members having a height less than the height of said box.

4. The container of claim 2, one of said plurality of vertical members on one of said side walls having a first indentation formed into the top surface, another of said plurality of vertical members on the other of said side walls having a second indentation formed into the top surface, said first indentation aligned with said second indentation within said box.

5. The container of claim 4, said first and second indentations having an angled surface, said first and second indentation for selectively receiving the bottom portion of said panel.

6. The container of claim 1, said panel being a flat member having a front side and a back side, said panel having a thickness less than the width of said first and second vertical slots.

7. The container of claim 6, said panel having an abrasion-resistant material fastened to said panel between said horizontal slots.

8. The container of claim 1, said lure receiving means comprising:
a flat surface having a size suitable for receipt into said horizontal slots of said panel, said flat surface slidable within said horizontal slots; and
a circular receiving member connected to and extending outwardly from said flat surface, said circular receiving member for engaging a portion of a lure.

9. The container of claim 8, said circular receiving member being a clip having an open position and a closed position, said open position for receiving the shank of a treble hook of said lure, said closed position for locking said lure in position adjacent said panel.

10. The container of claim 1, said box having a top surface hingedly connected to the back wall of said box.

11. The container of claim 1, said box having a plurality of said first vertical slot and a plurality of said second vertical slot extending along said side walls, each of said plurality of first vertical slot being aligned with a corresponding slot of said plurality of said second vertical slot.

12. The container of claim 1, further comprising:
a plurality of panels slidably received within said box, said plurality of panels being arranged in parallel relation to each other, each of said plurality of panels being opaque.

13. A panel for the receipt of crankbait comprising:
a flat member having a front side and a back side;
a plurality of first horizontal slots extending across said front side of said flat member, said plurality of first horizontal slots being in parallel relation to one another;
said plurality of horizontal slots comprising formed bars affixed to said front side and said back side of said panel, said formed bars being formed so as to define a slide area extending through said bars;
plurality of second horizontal slots extending across the back side of said flat member, said plurality of said second horizontal slots being in parallel relation to one another; and
crankbait receiving means slidably received within said first and second horizontal slots, said crankbait receiving means for releasably receiving a portion of said crankbait.

14. The panel of claim 13, said first and second horizontal slots being formed bars affixed to the surface of said flat member, said formed bars defining a pathway for said crankbait receiving means.

15. The panel of claim 14, further comprising:
an abrasion-resistant material affixed to the surface of said flat member in the areas between said first and second horizontal slots.

16. The panel of claim 15, said abrasion-resistant material being cork, said abrasion-resistant material being adhesively fastened to said flat member.

17. The panel of claim 13, said crankbait receiving means comprising:
a flat member having a size suitable for receipt into said first and second horizontal slots, said flat member slidable within said first and second horizontal slots; and
a circular receiving member connected to and extending outwardly from said flat member, said circular receiving member for engaging a portion of said crankbait.

18. The panel of claim 17, said crankbait receiving means further comprising:
a second circular receiving member affixed to a second flat member, said second circular receiving member defining an opening having a size suitable for receiving the shank of a treble hook of crankbait.

19. The panel of claim 15, said circular receiving member being a clip having an open position and a closed position, said open position for receiving the shank of a treble hook of said crankbait, said closed position for locking said crankbait in position adjacent said flat member.

* * * * *